United States Patent [19]
Plough et al.

[11] 3,872,418
[45] Mar. 18, 1975

[54] ELECTRICAL RELAY DEVICE

[75] Inventors: Charles T. Plough; H. Keith Eastwood, both of Beaconsfield; Marcus Arts, Longueuil, Quebec, all of Canada

[73] Assignee: Multi-State Devices Ltd., Dorval, Province of Quebec, Canada

[22] Filed: Jan. 7, 1974

[21] Appl. No.: 431,428

[52] U.S. Cl. .................... 338/23
[51] Int. Cl. .................... H01c 7/04
[58] Field of Search .................... 338/13, 23–25

[56] References Cited

UNITED STATES PATENTS

| | | | |
|---|---|---|---|
| 3,503,030 | 3/1970 | Matsumoto et al. | 338/23 |
| 3,614,345 | 10/1971 | Quinn | 338/23 X |
| 3,621,446 | 11/1971 | Smith | 338/23 |

*Primary Examiner*—C. L. Albritton
*Attorney, Agent, or Firm*—Spencer & Kaye

[57] ABSTRACT

An electrical relay device comprises a first substrate of thermal insulative material mounted on a suitable heat conductive support, a heater film deposited on such first substrate, first electrical contacts mounted on the first substrate and connected to the heater film for connecting the heater film to a source of control voltage, a second substrate having a mass smaller than the first ssubstrate mounted on top of the heater film, a thin film of a sensing material showing a large change of impedance at a critical temperature deposited over the second substrate, and second electrical contacts on the second substrate and connected to the film of sensing material for connecting it to the terminals of a controlled circuit. The material of the second substrate is selected so as to optimize the sensing material properties or the relay performance properties.

9 Claims, 2 Drawing Figures

ELECTRICAL RELAY DEVICE

This invention relates to an electrical relay device, and more particularly to semi-conductor thermal relays using a heater to heat a sensor element made of a material exhibiting a large change of impedance at a critical temperature to switch the sensor element to its low impedance state.

BACKGROUND OF THE INVENTION

Thermal relays of the above type have recently been disclosed in U.S. Pat. No. 3,621,446 issued Nov. 16, 1971, and more particularly in U.S. application No. 293,323 filed Sept. 28, 1972, and assigned to the same assignee as the present application. In this application, the heater and the sensor elements are located on opposite sides of a substrate providing high electrical isolation between the heater, which is connected to a source of high control voltage, and the sensor element, which is normally connected to a controlled circuit operating at a relatively low voltage. The substrate is itself mounted on a ceramic plate secured to a header.

While the device described in the above patent application achieved the type of performance disclosed, it has a number of disadvantages. When the sensor and heater elements are mounted on opposite sides of the substrate, it has been experienced that:

a. the mounting is difficult and the thermal characteristics vary from device to device because the substrate must be mounted on the ceramic plate with an electrically conducting bead such as epoxy or solder, and it is difficult to make this mounting consistent, b. processing substrates with elements on both sides of a substrate is difficult and expensive because a defective device on either side causes a reject, and c. the thickness of the substrate is limited by the breakage which occurs in handling.

When both the sensor and heater elements are mounted on the same side of the substrate, the substrate can be thinned at the last operation which is important in reducing the mass of the substrate and thus improving switching speed. However, the area of the substrate must be approximately doubled to allow room for both elements, which means that the mass remains the same. The processing losses will be similar to above since the substrate must go through all the process steps of both elements. In addition, the response speed is slower since heat must be transmitted longitudinally between the two elements.

With relay devices using two sensors for temperature compensation as disclosed in U.S. patent application No. 362,294 filed May 21, 1973 and assigned to the same assignee as the present application, thermal matching between the two sensors is difficult to achieve because the proper heating ratio between the two sensor elements is not easy to obtain.

SUMMARY OF THE INVENTION

It is therefore an object of the present invention to provide a thermal relay which is easier to manufacture, and produces a minimum number of rejects.

It is also an object of the present invention to provide a thermal relay having a fast response speed.

It is a further object of the present invention to provide a temperature compensated thermal relay using the same heater for operating two sensor elements, wherein the heat ratio of the two sensor elements may be easily achieved.

The above objects of the invention are fulfilled by providing a relay structure comprising a first substrate of thermal insulative material mounted on a suitable heat conductive support, a heater film deposited on the first substrate, first electrical contacts mounted on the first substrate and connected to the heater film for connecting the heater film to a source of control voltage, a second substrate of a material having a mass smaller than the first substrate mounted on top of the heater film, a thin film of a sensing material showing a large change of impedance at a critical temperature deposited over the second substrate, and second electrical contacts mounted on the second substrate and connected to such film of sensing material for connecting the sensing material to the terminals of a controlled circuit. The material of the second substrate is selected to optimize the sensing material properties or the relay performance properties.

In order to obtain high switching speeds, the mass of the second substrate may be reduced after deposition of the sensing film material to the minimum value required to support such sensing material.

The first and the second substrates are secured to the support and to the heater film respectively by means of an adhesive material which is electrically insulative.

The heater film may have the same surface area as the second substrate so as to ease the requirements of the heater element.

In the manufacture of a temperature compensated thermal relay using two sensor films, such films may be deposited on the second substrate at a position such that a single heater positioned on the first substrate may ensure the proper heat ratio for the two sensor films.

BRIEF DESCRIPTION OF THE DRAWINGS

The invention will now be disclosed with reference to a particular embodiment thereof illustrated, by way of example, in the accompanying drawings wherein.

DETAILED DESCRIPTION OF THE DRAWINGS

Figure 1:
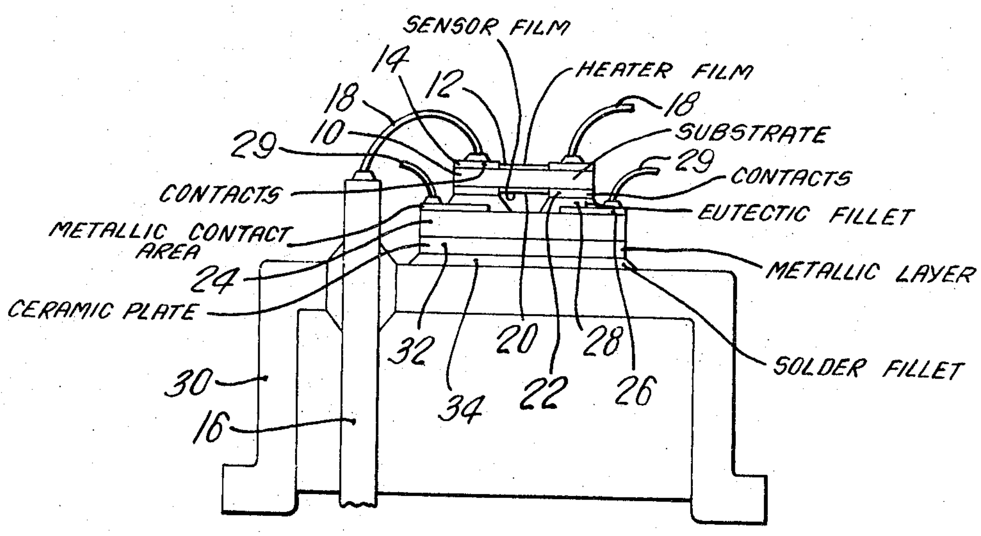
FIG. 1 shows a schematic view of the thermal relay disclosed in the above-identified U.S. application No. 293,323.

Referring to FIG. 1 of the drawings, there is shown a thermal relay such as disclosed in the above-identified U.S. application No. 293,323 and comprising a substrate 10 made of good thermal conductive material such as sapphire, alumina ($Al_2O_3$) or beryllium oxide (BeO). A thin film heater 12 is mounted on substrate 10 and provided with contacts 14 permitting to connect the heater to terminals of a suitable control voltage source, such as post 16 through wire connection 18. A sensor film 20 made of a material exhibiting a large change of impedance at a critical temperature is mounted on the opposite side of substrate 10. Examples of such materials are vanadium dioxide ($VO_2$), vanadium sesquioxide ($V_2O_3$), silver sulphide ($Ag_2S$) and trititanium pentoxide ($Ti_3O_5$). The sensor film 20 is provided with contacts 22. Contacts 14 and 22 may be made of a nickel-chrome alloy covered with a thin gold layer as disclosed in the above-identified U.S. application No. 293,323, or of platinum as disclosed in U.S.

application No. 335,651 filed Feb. 26, 1973 and assigned to the same assignee as the present application. The choice of the material of the contacts will depend on the nature of the substrate and/or of the sensor or heater elements, and also on the technique used to deposit the films as care must be taken not to damage any of the films by excessive diffusion of one metal into another and certain metals result in lower contact resistance to particular sensor materials than others.

The substrate 10 is mounted on a ceramic plate 24 which is provided with metallic contact areas 26, and a wire connection is made between contacts 22 and metallic contact areas 26 by means of an eutectic fillet 28 made of epoxy or solder. Suitable wire connections such as leads 29 are provided for connecting the sensor element to the terminals of a controlled circuit, these terminals being in the form of posts like post 16. The ceramic plate 24 is mounted on a suitable header 30 by means of a metallic layer 32 and a solder fillet 34.

As mentioned previously, mounting of the substrate 10 on the ceramic plate 24 by means of the eutectic fillet 28 is difficult and the thermal characteristics vary from device to device. In addition, processing substrate 10 with a heater element on one side and a sensor element on the other side is difficult and expensive since a defective element on either side causes a reject of the whole device. Thickness of the substrate is also limited by breakage which occurs in handling.

The heater and sensor elements 12 and 20 could be mounted on the same side of the substrate 10. This would permit to reduce the thickness and thus the mass of the substrate and so improve the switching speed. However, the area of the substrate would have to be increased and the mass would, consequently, be the same. In fact, the switching speed would be reduced since heat would be transmitted longitudinally through the two elements 12 and 20. The processing losses would also be the same since the substrate must go through all the process steps of both elements.

Figure 2:
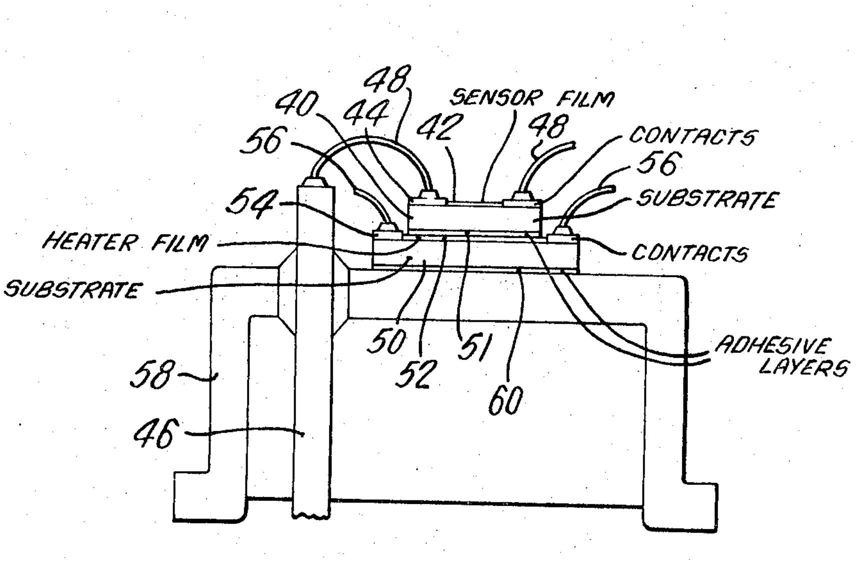
FIG. 2 illustrates a schematic diagram of the thermal relay in accordance with the invention.

The above disadvantages have been substantially overcome by the structure illustrated schematically in FIG. 2 wherein the heater and the sensor elements are mounted on separate substrates. The device consists of a substrate 40 upon which is deposited a sensor film 42 provided with contacts 44 which are connected to suitable terminals such as posts 46 through wire connections 48. The sensor substrate 40 is attached to a separate heater substrate 50 by a thin film 51 of electrically insulating adhesive material such as epoxy or glass. The substrate 40 is made of a material such as sapphire, alumina ($Al_2O_3$), beryllium oxide (BeO) or quartz ($SiO_2$). The substrate material may either be a single crystal material selected to optimize the electrical properties of the sensor material deposited on it or a material with thermal properties and thickness that will optimize the speed of the device. For example, the substrate material may be single crystal sapphire and the sensing material be vanadium dioxide, doped vanadium dioxide or $V_2O_3$. The substrate material may also be single crystal quartz and the sensing material $V_3O_5$. A heater film 52 is mounted on the substrate 50. The substrate 50 is made of a good thermal insulator such as quartz or glass. The heater film is provided with contacts 54 for connection to a source of control voltage through suitable wire connections 56. The substrate is mounted on a header 58 which has a relatively low thermal impedance with a film 60 of adhesive material such as epoxy or glass.

The above disclosed relay device may be made by any well known techniques such as the one disclosed in the above-identified U.S. application No. 293,323 and the description of such technique is thus not required.

The structure disclosed in FIG. 2 has the following advantages over the structure of FIG. 1.

1. The sensor substrate and the heater substrate can be manufactured separately and the bad devices sorted out of each group before assembling. This improves yields and costs.

2. The thickness of the thin films of electrical insulating material 51 and 60 for mounting both substrates can be easily controlled by the pressure used in mounting the die. Since the mounting material 51 is an electrical insulator, excess material is squeezed out and with reasonable control does not cause any problems. Since films 51 and 60 are very thin, they do not have significant effect on heat flow. Such films must be selected so that a very thin film is achieved and must also have good adhesive properties. In addition, the films 51 and 60 must be able to withstand the temperature of the heater 52 which is normally limited to about 50°C above the transition temperature of the sensor element 42.

3. The sensor substrate 40 can be made very small since it supports the sensor element 42 alone, and may even be thinned after the sensor element 42 is mounted thereon whereby to improve switching speed.

4. The heater element 52 can be made the same size as the sensor substrate 40. This eases the requirements on the heater element since fine geometries are not usually required.

5. A single heater can be used for two sensor elements as used with temperature compensated relays of the type disclosed in the above-identified U.S. application No. 362,294.

The proper ratio of heating between the two sensor elements can be achieved easily by offsetting the die on the heater.

6. The relationship between operating power and speed of switching can be easily controlled by adjusting the thermal conductivity of the heater substrate and its thickness and the resistance of the heater element. Turn-on time is controlled by the amount of power applied to the heater and the thickness of the heater substrate (the sensor die is kept as small as possible). Turn-off time is controlled by the thermal conductivity of the heater substrate and the header. Thus, the heater substrate material and the thickness of that substrate will govern turn-off time.

Although the invention has been disclosed with reference to a preferred embodiment thereof, it is to be understood that various modifications may be made thereto and that the invention is to be limited by the scope of the claims only.

We claim:

1. An electrical relay device comprising:

a. a first substrate of thermal insulative material mounted on a suitable heat conductive support;

b. a heater film deposited on said first substrate;

c. first electrical contacts mounted on said first substrate and connected to said heater film for connecting said heater film to a source of control voltage;

d. a second substrate having a mass smaller than said first substrate mounted on top of said heater film;

e. a thin film of a sensing material exhibiting a large change of impedance at a critical temperature deposited on said substrate, said second substrate being made of a single crystal material selected to optimize the electrical properties of the sensing material deposited thereon; and f. second electrical contacts mounted on said second substrate and connected to said thin film of sensing material for connecting it to the terminals of a control circuit.

2. An electrical relay device as defined in claim 1, wherein the mass of said second substrate is reduced to the minimum required to support the sensing material so as to increase switching speed of the relay.

3. An electrical relay device as defined in claim 1, wherein said second substrate is secured to said heater film by means of an adhesive material which is electrically insulative.

4. An electrical relay device as defined in claim 3, wherein said first substrate is secured to said support by means of an adhesive material.

5. An electrical relay device as defined in claim 1, wherein said heater film has substantially the same surface area as the second substrate.

6. An electrical relay device as defined in claim 1, wherein two sensor films are formed on the second substrate and spaced so that the heater film may provide the proper heat ratio to the two sensor films for ensuring temperature compensation to the electrical relay.

7. An electrical relay device as defined in claim 1, wherein the sensor film is selected from the group consisting of vanadium dioxide, doped vanadium oxide, $V_2O_3$ and $V_3O_5$.

8. An electrical relay device as defined in claim 1, wherein the second substrate is single crystal sapphire and the sensing material is selected from the group consisting of vanadium dioxide, doped vanadium dioxide and $V_2O_3$.

9. An electrical relay device as defined in claim 1, wherein the second substrate is single crystal quartz and the sensing material is $V_3O_5$.

* * * * *